United States Patent [19]

Laval, Jr.

[11] 4,140,638
[45] Feb. 20, 1979

[54] SEPARATING DEVICE FOR FLUID SYSTEM

[76] Inventor: Claude C. Laval, Jr., 244 N. Farris Ave., Fresno, Calif. 93705

[21] Appl. No.: 874,406

[22] Filed: Feb. 2, 1978

[51] Int. Cl.² .............................................. B01D 21/26
[52] U.S. Cl. ................................. 210/322; 210/512 M
[58] Field of Search .................. 55/177; 210/242, 322, 210/512 R, 512 M

[56] References Cited

U.S. PATENT DOCUMENTS

| | | | |
|---|---|---|---|
| 2,799,208 | 7/1957 | Scott | 210/512 M |
| 3,289,608 | 12/1966 | Laval, Jr. | 210/512 R |
| 3,512,651 | 5/1970 | Laval, Jr. | 210/512 R |
| 3,568,837 | 3/1971 | Laval, Jr. | 210/512 M |
| 3,947,364 | 3/1976 | Laval, Jr. | 210/512 R |
| 3,963,073 | 6/1976 | Laval, Jr. | 166/105.1 |
| 4,017,275 | 4/1977 | Hoagson | 55/177 X |

Primary Examiner—John Adee
Attorney, Agent, or Firm—Huebner & Worrel

[57] ABSTRACT

A device for separating a fluid system, having at least two phases of different specific gravities, including a lower preceding centrifugal separator; and an upper succeeding centrifugal separator, each of said separators having an axially upwardly extended centrifuging chamber providing an upper tangential inlet through which the fluid system enters the chamber to swirl therein, a lower outlet for drawing the heavier phase from the chamber, and a tubular vortex finder through which the lighter phase exits from the chamber mounted coaxially within the upper end of the chamber having a lower end in the chamber downwardly spaced from the inlet and an upper end upwardly of the chamber, said separators being substantially axially aligned, and a substantially cylindrical conduit circumscribing the upper separator having a lower end connected to the upper end of the vortex finder of the lower separator and to the inlet of the upper separator, the inlet of the lower separator being adapted for connection to a source of the fluid system under pressure while the upper end of the vortex finder of the upper separator is subject to a substantially lower pressure whereby the fluid system enters the inlet of the lower separator and swirls downwardly in its chamber to separate the heavier phase to settle outwardly and downwardly therein and for passage of the once separated lighter phase upwardly through the vortex finder of the lower separator through the conduit and in the inlet of the upper separator to swirl downwardly in its chamber to separate any residual heavier phase in the once separated lighter phase to settle outwardly and downwardly therein and for passage of the twice separated lighter phase upwardly through the vortex finder of the upper separator.

14 Claims, 6 Drawing Figures

SEPARATING DEVICE FOR FLUID SYSTEM

BACKGROUND OF THE INVENTION

1. Field of the Invention

The present invention relates to a separating device for a fluid system having phases of different specific gravities, and more particularly to such a device which includes a plurality of separators in which such a fluid system is swirled about an axis for centrifugal separation of two or more phases and in which the separators are disposed axially of each other for flow of the system through the separators in succession.

2. Description of the Prior Art

The prior art is replete with a variety of separators for separation of a fluid system having phases of differing specific gravities into such phases by centrifugal or vortexing flow of the system within the separator. Such separators have two basic and conflicting objectives. First, the separation of the phases should be as effective as possible. That is, when the separation is complete each of the separated phases should contain as little as possible of the balance of the original fluid system. Second, the pressure drop through such a separator should be as low as possible to minimize energy loss. This second objective is particularly desirable where large quantities of a fluid system require separation, as in the commercial purification of well water. Either one of these objectives can be attained at the sacrifice of the other, but it is of course desirable to provide an arrangement of separators achieving both of the objectives simultaneously. The conflict in these objectives is exemplified where separation of such a fluid system is achieved more effectively by simply causing the fluid to flow through a series of such separators. Such an arrangement provides more effective separation since portions of a phase incompletely separated by a preceding separator can be removed in a succeeding separator. However, the total pressure drop of such an arrangement is usually multiplied by the number of separators in series. The initial expense of such an arrangement is also increased by the number of separation steps involved.

Arrangement of such separators for flow therethrough in series usually results in increased pressure drop, but does not necessarily result in more effective separation since the relative proportions of and remaining constituents of the phases are altered with each separation. For example, where the phases are water and sand, the preceding separator can remove the coarse particles of sand so that the use therewith of a succeeding, identical separator also adapted to removal of such larger particles results in removal of little, if any, additional sand.

Centrifugal separators are commonly disposed in wells below the level of fluid therein at a location at which the fluid is extracted therefrom to remove undesirable phases from the fluid so such phases will not harm other devices through which the water flows upstream of such a location. A typical such usage is the employment of such a separator on the inlet to a submersible pump inserted into a water well to remove sand which rapidly wears such pumps. It is of course desirable to provide highly effective separation in such an application without loss of suction to the pump. Normally the space available in such a well is extremely limited. Thus, a series arrangement of separators used in such an application must be configured so as to be inserted in the confines of a well while providing a flow passage through successive separators which results in minimal pressure drop and does not prevent use of separators adapted to removal of phases of varying characteristics.

SUMMARY OF THE INVENTION

Accordingly, it is an object of the present invention to provide an improved separating device for a fluid system.

Another object is to provide such a device providing effective separation of phases of a fluid system with a minimal pressure drop.

Another object is to provide such a device which is proportioned and dimensioned for insertion into a well.

Another object is to provide such a device in which successive separators conveniently can be configured for removal of such phases having varying characteristics.

Another object is to provide such a device in which any number of separators can be disposed in series and in which the passages for flow of the fluid system are disposed so as to result in minimal pressure drop.

Another object is to provide a pair of series interconnected centrifugal separators for a multiple phase fluid system having the outlet of one connected to the inlet of the other by a cylindrical conduit through which the system continues to swirl as it passes from one separator to another.

Further objects and advantages are to provide improved elements and arrangements thereof in a separating device for a fluid system which can be economically manufactured and is durable, dependable, and fully effective in performing its intended functions.

DESCRIPTION OF THE PREFERRED EMBODIMENT

Figure 1:
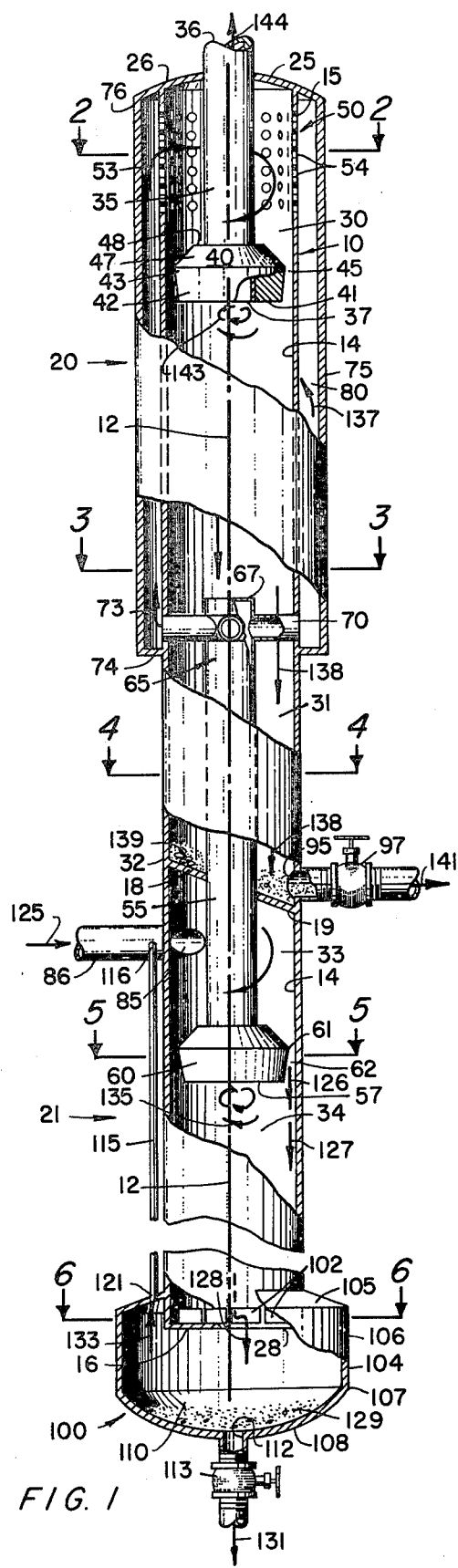
FIG. 1 is a side elevation of a separating device for a fluid system embodying the principles of the present invention with portions broken away to a vertical axial section to show internal construction.

In FIG. 1 is shown a device embodying the principles of the present invention for separating a fluid system having at least two constituent fluid phases distinguished from each other by different specific gravities. While the device is illustrated as used in separating solids from liquids, such as sand from water, it may be used to separate any flowable phases, liquid, gaseous or particulate where the specific gravities are sufficiently different as to permit such separation.

The device has a substantially cylindrical side wall 10 concentric to an upwardly extended axis 12. The side wall has a cylindrical, inwardly disposed surface 14 which is concentric with the axis and forms a surface of revolution thereabout. The side wall is axially elongated and has an upper end 15 and a lower end 16. A division plate 18 extends transversely of the side wall 10 approximately at the center thereof. The division plate is inclined to the axis 12 so that the plate has a lower edge portion 19 defined peripherally thereof adjacent to the side wall. The division plate transversely divides the device, defining an upper, succeeding centrifugal fluid separator 20 and a lower, preceding centrifugal separator 21.

The device has a fractionally spherical upper head 25 closing the upper end 15 of the cylindrical side wall and extending marginally outwardly thereof. The head has a circular outer edge 26 spaced outwardly of the side wall in concentric, circumscribing relation thereto. The device has a disc 28 closing the lower end 16 of the side wall and extending normally to the axis 12.

The upper separator 20 has a vortexing chamber 30 circumscribed by the side wall 10 and extending axially therewithin from the upper head 25 to a position approximately at the center of the upper separator. The upper separator has a receiving chamber 31 circumscribed by the side wall and extending axially therewithin from the upper vortexing chamber to the division plate 18. Said receiving chamber has a lower end 32 adjacent to the division plate.

The lower separator 21 has a vortexing chamber 33 circumscribed by the side wall 10 and extending axially therewithin from the division plate 18 to a position approximately at the center of the lower separator. The receiving chamber 31 of the upper separator 20 is thus axially aligned with the vortexing chamber of the lower separator. The lower separator has a receiving chamber 34 circumscribed by the side wall and extending axially therewithin from the vortexing chamber of the lower separator to the disc 28. The vortexing chambers 30 and 32 are continuous with their respective receiving chambers 31 and 33.

The upper separator 20 is provided with an upper cylindrical vortex finder 35 extending concentrically about the axis 12 through the upper head 25. The upper vortex finder has an upper end 36 above the head and an open lower end 37 disposed centrally of the vortexing chamber 30.

An annular ring 40 is mounted on the upper vortex finder in circumscribing relation thereto adjacent to the lower end thereof. The ring has an annular planar lower surface 41 circumscribing said lower end disposed in right-angular relation to the axis 12. The ring has a lower frusto-conical surface 42 extending upwardly and outwardly of the circular surface to a circular upper edge 43 concentric with the side wall and inwardly spaced therefrom. An annular passage 45 is defined between the upper edge and the side wall. The ring has an upper frusto-conical surface 47 extending upwardly and inwardly from the circular upper edge 43. The ring has a planar circular upper surface 48 extending in parallel, concentric relation to the planar lower surface thereof. The ring is dimensioned and proportioned so that the edge 43 is approximately at the axial center thereof, and so that the diameter of the upper circular surface of the ring is substantially less than the diameter of the lower circular surface thereof.

Figure 2:
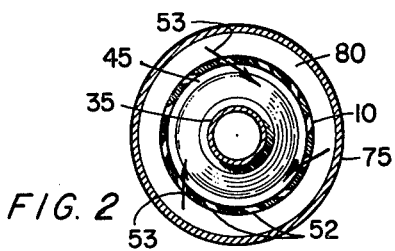
FIG. 2 is a transverse section of the device of FIG. 1 taken at the position indicated by line 2—2 of FIG. 1.

The upper separator 20 has numerous inlets 50 disposed in the upper end of the wall 10 above the lower end of the vortex finder 35 for admission of fluid through the side wall 10 into the upper vortexing chamber 30. The inlets are bores tangential to a circle concentric to the vortex finder. The bores are disposed so that fluid flow therethrough into the vortexing chamber 30 is directed, as indicated by the arrows 53, so as to cause such fluid to swirl clockwise, as viewed in FIG. 2.

The lower separator 21 has a cylindrical vortex finder 55 extended concentrically about the axis 12 through the division plate 18. It has an open lower end 57 downwardly spaced from the plate. A ring 60, similar to the ring 40, is mounted in circumscribing relation on the lower end 37 of the vortex finder. The ring 60 has a circular edge 61, corresponding to the edge 43 of the ring 40, which with the side wall 10 defines an annular passage 62.

The lower vortex finder 55 has an upper, outlet end 65 disposed above the plate 18 axially centrally of the receiving chamber 31 of the upper separator 20. This upper end is closed by a disc 67 extending transversely of the lower vortex finder. The lower vortex finder is thus isolated from said receiving chamber so that there is no direct fluid flow communication therebetween.

Figure 3:
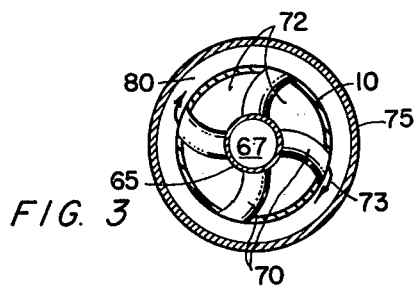
FIG. 3 is a transverse section taken at the position indicated by line 3—3 of FIG. 1.

The device has a plurality of conduits 70 extending from the upper end 65 of the lower vortex finder 55 through the side wall 10. The conduits have, as best shown in FIG. 1, a circular cross section and, as shown in FIG. 3, extend transversely, outwardly from the lower vortex finder in downwardly adjacent relation to the disc 67. The conduits, preferably, are helically curved so that fluid flowing therethrough is directed tangentially to the axis 12, as the fluid is discharged from the conduit through the side wall, so as to swirl thereabout. The conduits extend transversely through the receiving chamber 31 but are isolated from direct fluid flow communication with said receiving chamber.

An annular plate 74 circumscribes the cylindrical side wall 10 downwardly adjacent to the helical conduits 70. This plate is welded to the side wall and has a peripheral diameter substantially equal to the diameter of the upper head 25. A cylindrical outer wall 75 is disposed in circumscribing concentric relation to the side wall 10 and is welded to the upper head 25 and to the annular plate 74. The plate 74 thus defines an annular chamber or conduit 80 concentrically about the side wall 10 extended from the open outer ends of the conduits 70 and the inlets 50.

The lower separator 21 has an inlet 85 extending through the side wall 10 tangentially to the axis 12 between the division plate 18 and the annular ring 60. A fluid system supply line 86 is connected to the inlet. As will subsequently become apparent, the supply line is directed so that a fluid system flowing therethrough into the vortexing chamber 33, is caused to swirl in the same direction as fluid passing upwardly through the chamber 80 and through the vortexing chamber 31. The flow from the inlet 85 and the direction of swirl in the vortexing chamber 33 are indicated by the arrows 90 in FIG. 4.

Figure 4:
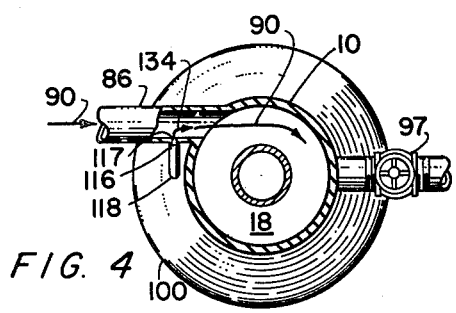
FIG. 4 is a transverse section taken at the position indicated by line 4—4 of FIG. 1.
Figure 5:
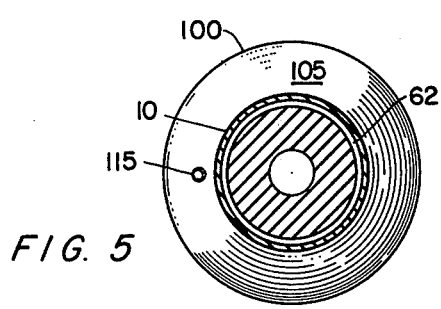
FIG. 5 is a transverse section taken at the position indicated by line 5—5 of FIG. 1.
Figure 6:
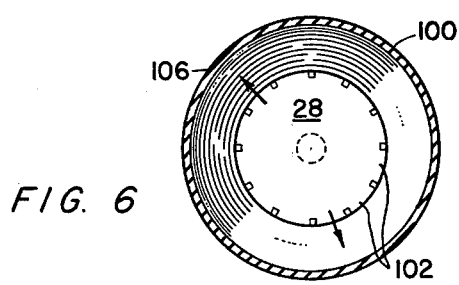
FIG. 6 is a transverse section taken at the position indicated by line 6—6 of FIG. 1.

The lower end 32 of the receiving chamber 31 of the upper separator 20 is provided with an opening 95, shown in FIG. 1, through the side wall 10 for drawing off a heavy phase of a fluid system, subsequently to be described, from the lower end. The opening is disposed at the lowest point of the receiving chamber in upwardly adjacent relation to the lower edge portion 19 of the division plate 18. An upper drain valve 97, shown in FIGS. 1 and 4, is connected to the opening to control the drawing off of said phase.

The lower end 16 of the side wall 10, which forms the lower end of the receiving chamber 34 of the lower separator 21, is provided with an apparatus, indicated generally by the numeral 100 and shown in FIGS. 1, 4, 5, and 6, for drawing off a heavy phase of a fluid system. A plurality of openings 102, shown in FIGS. 1 and 6, extend through the side wall 10 and are disposed in circumferentially spaced relation thereabout. A purge bowl 104 is mounted on the lower end of the side wall 10. The purge bowl includes an annular upper wall 105 fixed to the lower end in circumscribing relation thereto and in upwardly adjacent relation to the openings. The upper wall has an outer diameter approximately equal to the outer diameter of the upper head 25 and is, similarly thereto, of fractionally spherical form. The purge bowl has a cylindrical wall 106 extending downwardly from the periphery of the upper wall of the bowl. This cylindrical wall is substantially equal in diameter to said periphery and extends therefrom to a lower end 107 of the wall downwardly spaced from said periphery. The purge bowl has a fractionally spherical, upwardly disposed concave lower wall 108 fixed to the lower end of the cylindrical wall. The interior of the purge bowl constitutes a sediment chamber 110. The lower wall 108 is provided, as shown in FIG. 1, with a central opening 112 closed by a drain valve 113 to control the drawing off of sediment from the chamber.

The apparatus 100 includes a tube 115 interconnecting the sediment chamber 110 and the supply line 86. It permits sediment settling in the sediment chamber to displace fluid therefrom through the tube back into the entering fluid system.

OPERATION

The operation of the described embodiment of the present invention is believed to be clearly apparent and is briefly summarized at this point. In operation, the device for the separation of a fluid system is arranged for the flow of such a system having at least two phases distinguished by different specific gravities into the inlet 85 of the lower vortexing chamber 33 as indicated by the arrow 90. Such a system is typified for purposes of the present description by a two-phase system having water as the lighter phase and sand as the heavier phase. Flow of the system into the device can be produced by connecting the inlet to the discharge of a pump. Such a flow can also be induced, as is typically the arrangement when the device is inserted into a well, by connecting the upper, outlet end 36 of the upper vortex finder 35 to the suction of a pump to draw water from the device. However, when used in a well, the supply line 86 is removed for the direct admission of the fluid system through the submerged inlet 85 and the valves 97 and 113 are removed and their respective openings 95 and 112 connected to drain lines not shown extended downwardly in such well, as is already known in the art.

The described embodiment of the device of the present invention separates the constituent phases of fluid having at least two phases of different specific gravities. The phases, typically, consist of a lighter phase, such as water, and a heavier phase, such as sand, suspended in the lighter phase and flowing with it. The system, as indicated in FIG. 1, enters the device through the inlet 85 to the vortexing chamber 33 of the lower separator 21 as indicated by the arrow 125. The system enters the chamber, is swirled therein, as indicated by the arrows 90, and swirls downwardly through the annular passage 62, as indicated by the arrows 126. The system continues to swirl downwardly of the lower end 37 of the lower vortex finder 55 so that a portion of a heavier phase centrifugally is separated and settles downwardly into the receiving chamber 34, as indicated by the arrow 127. The heavier phase then passes through the openings 102, as indicated by the arrows 128 in FIG. 1, into the sediment chamber 110. The heavier phase accumulates in the sediment chamber, as indicated by the numeral 129, and can be drawn off through the lower drain valve 113 as shown by the arrow 131.

A relatively small flow of lighter phase is induced from the sediment chamber 110 through the pipe 115 into the inlet 85. This flow is shown entering the pipe by the arrow 133 at the lower end 121 thereof in FIG. 1 and exiting through the pipe by the arrow 134 in FIG. 4.

The balance of the fluid system entering the lower separator 21, that is, the portion which does not settle downwardly into the receiving chamber 34 thereof, swirls upwardly and centrally therein, into the lower end 57 of the lower vortex finder 55 as indicated by the arrows 135 in FIG. 1. Said balance of the fluid system passes upwardly through the lower vortex finder and then flows outwardly thereof through the helical conduits 70 as shown by the arrows 73 in FIG. 3. Said balance of the system then swirls upwardly through the cylindrical chamber 80 between the outer wall 75 and the side wall 10, as indicated by the arrow 137, and through the bores 52, as shown by the arrows 53, into the vortexing chamber 30 of the upper separator 20.

Said balance of the system centrifugally is separated in the vortexing chamber 30, in a manner similar to the separation in the lower separator, into a heavier phase portion which settles downwardly, as indicated by the arrows 138, through the receiving chamber 31. This portion settles through the openings 72 between the helical conduits and accumulates, as shown by the numeral 139, above the division plate 18 where the portion can be drawn off through the opening 95 and through the upper drain valve 97 as indicated by the arrow 141. The separated, remaining portion of the fluid system, consisting of a lighter phase such as water, swirls upwardly into the lower end 37 of the upper vortex finder 35, as shown by the arrows 143, and exits from the upper separator 20 as indicated by the arrow 144.

When the swirling system flows downwardly through the annular passage 62 between the ring 60 and the side wall 10 the relatively narrow width of the passage causes the swirling velocity of the fluid to be maintained or increased to enhance the centrifugal separating action. The ring also inhibits turbulence therebelow to aid in settling separation in the receiving chamber. The sand centrifugally is urged outwardly against the side wall where a substantial portion thereof settles downwardly through the receiving chamber 31 into the sediment chamber 110, as indicated by the arrows 127 and 128 for accumulation as indicated at 129. While this settling occurs, the remainder of the system swirls upwardly into the lower end 57 of the lower vortex finder 55 for further separation by the upper centrifugal separator 20.

The receiving chamber 34 is relatively quiescent since only a very small fraction of the water flows therethrough. As a result, the settling of the sand is enhanced. The openings 102 from the receiving chamber into the sediment chamber 110 are arranged for flow radially of the side wall 10 so that centrifugal action does not occur. As described in U.S. Pat. No. 3,512,651 issued to me on May 19, 1970, a small amount of water is drawn from the sediment chamber, as indicated by the arrow 133, through the pipe 115 to admit the sand downwardly into the sediment chamber. This amount of water is very small so that no significant turbulence is created by its flow through the receiving chamber and the sediment chamber. This withdrawal of water through the pipe provides space in the sediment chamber for the relatively large portion of the sand removed from the system by the lower separator 21.

The successive separation of the phases of the fluid system achieves a significantly improved cleansing of the water, or other phase which is lighter than the phase accumulated at 129 and 138. Such improved separation is achieved with a minimum pressure drop which means with a minimum energy loss. Once the swirling action is initiated in the lower separator 21, it continues in the same direction concentrically about the axis 12 through the lower vortexing chamber 33, the lower vortex finder 55, helical conduits 70, cylindrical chamber or passage 80, upper vortexing chamber 30, and upper vortex finder 35. As the heavier phase settles in the receiving chambers 34 and 31, the swirling action diminishes and the fluid is quiescent in the purge bowl 104 and in the receiving chamber 31 beneath the helical conduits 70.

The sand 139 accumulated above the division plate 18 and in the sediment chamber 110, as indicated by the numeral 129, is drawn off by opening the drain valves 97 and 113, respectively. These valves are depicted as manually operated, however, it is readily apparent that power operated valves can be substituted for manually operated valves. Such power operated valves can be remotely controlled, if desired, and such control is particularly advantageous when the device for separating fluid system is inserted in a well.

The described embodiment of the device of the present invention is particularly well adapted for the separation of a two-phase fluid system having a heavier phase, sand, and a lighter phase, water. However, it should be understood that other arrangements of coaxially aligned, juxtapositioned centrifugal separators can be used for separation of other multi-phase fluid systems. For example, a three-phase system could be separated into its constituent phases, by a device having the upper and lower separators, 20 and 21 respectively, each adapted to remove a single phase with the remaining phase exiting from the upper outlet end 36 of the upper vortex finder 35. More than two separators, similar to the separators 20 or 21, can be "stacked" axially for the separation of a plurality of individual phases of a fluid system or for the more effective separation of a single phase from another phase. The relatively low pressure drop and economical construction provided for fluid flow interconnection between centrifugal fluid separators connected in series by an upwardly extended vortex finder, such as 55, of each preceding separator, by helical conduits, such as 70, and by cylindrical chambers, such as 80, are advantageous where such a multiplicity of separators is utilized in a device for separation of a fluid system.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by Letters Patent is:

1. A device for separating the constituent phases of a fluid system having at least two phases distinguished from each other by different specific gravities comprising a lower preceding centrifugal separator; and an upper succeeding centrifugal separator, each of said separators having upper and lower ends, a vortexing chamber circumscribed by a side wall providing an inwardly disposed surface of revolution, a receiving chamber downwardly extended from the vortexing chamber, an inlet disposed substantially tangentially to the surface of revolution of the vortexing chamber adjacent to the upper end of its separator, and a tubular vortex finder extended substantially concentrically in the upper end of the vortexing chamber having a lower end therein below the inlet and an upper end above the upper end of the vortexing chamber, in which:
   A. the preceding and succeeding separators are disposed in substantial axial alignment, and including
   B. an annular chamber circumscribed by a side wall providing an inwardly disposed surface of revolution mounted in concentric circumscribing relation to the succeeding separator and upwardly extended in overlapping relation to the inlet of the succeeding separator; and
   C. means interconnecting the upper end of the vortex finder of the preceding separator with the annular chamber for the swirling passage of the fluid system from the vortex finder of the preceding separator to the inlet of the succeeding separator.

2. The device of claim 1 in which the inlets to the separators are extended tangentially in the same direction about the axes of the surfaces of revolution of their respective side walls to cause fluid entering therethrough into their respective vortexing chambers to swirl in the same direction.

3. The device of claim 1 in which the interconnecting means has a helical portion which swirls fluid passing therethrough in the same direction as the tangential disposition of the inlet of the succeeding separator to impart a preliminary swirling action to the fluid.

4. A device for separating the constituent phases of a fluid system distinguished from each other by different specific gravities comprising a lower preceding centrifugal separator; and an upper succeeding centrifugal separator, each of said separators having upper and lower ends, a vortexing chamber circumscribed by a side wall providing an inwardly disposed surface of revolution, a receiving chamber downwardly extended from the vortexing chamber, an inlet disposed substantially tangentially to the surface of revolution of the vortexing chamber adjacent to the upper end of its separator and a tubular vortex finder extended substantially concentrically to the upper end of the vortexing chamber having a lower end therein below the inlet and an upper end of the vortexing chamber, in which:
   A. the preceding and succeeding separators are disposed in substantial axial alignment;
   B. the upper end of the vortex finder of the preceding separator is extended concentrically up into the receiving chamber of the succeeding separator and is isolated from the fluid therein; and including
   C. conduit means interconnecting the upper end of the vortex finder of the preceding separator and the inlet of the succeeding separator comprising
   (1) a cylindrical wall concentrically circumscribing the side wall of the vortexing chamber of the succeeding separator and defining a cylindrical passage therebetween having an upper end in communication with the inlet of the succeeding separator and a lower end adjacent to the receiving chamber of the succeeding separator, and (2) a helical conduit extended from the upper end of the vortex finder of the preceding separator into the lower end of said passage.

5. The device of claim 4 in which the helical conduit extends transversely of the lower end of the receiving chamber and therewith defines an opening for the settling of the heavier phase therethrough.

6. The device of claim 5 including means for drawing off the heavier phase from the lower ends of the receiving chambers of the separators.

7. A device for separating a fluid system having at least two constituent phases distinguished from each other by different specific gravities comprising a lower preceding separator; and an upper succeeding separator, each of said separators having a vortexing chamber circumscribed by a side wall having a surface of revolution concentric to a common longitudinal upwardly extended axis, a receiving chamber downwardly extended from the vortexing chamber in fluid communication therewith for the settling of the heavier phase therein, and a tubular vortex finder extended substantially concentrically through the upper end of the vortexing chamber along said axis having an open inlet end in the vortexing chamber for removal of the portion of the fluid system that fails to settle in the receiving chamber, and an inlet extending through the side wall and tangentially to said axis into the vortexing chamber upwardly spaced from said inlet end of the vortex finder for admission of the fluid system into the vortexing chamber; in which:
   A. the vortex finder of the preceding separator extends upwardly into the receiving chamber of the succeeding separator and is isolated therefrom;
   B. conduit means extends from the upper end of the vortex finder of the preceding separator through the side wall of the succeeding separator; and
   C. the side wall of the succeeding separator is circumscribed by a by-pass chamber which extends axially of the vortexing chamber of said separator in overlapping fluid interconnection between the conduit means and the inlet of the succeeding separator.

8. The device of claim 7 in which
   A. the receiving chamber of the succeeding separator is substantially aligned with the vortexing chamber of the preceding separator,
   B. a division plate extends transversely of said axis downwardly closing said receiving chamber and upwardly closing said vortexing chamber,
   C. the vortex finder of the preceding separator extends through the division plate, and
   D. the conduit means is upwardly disposed from the division plate.

9. The device of claim 7 in which the conduit means includes a helical conduit for directing fluid into the by-pass chamber tangential to said axis, and the inlets of each of the separators extend through their respective side walls tangentially in the same direction.

10. The combination of a series of centrifugal fluid separators disposed in series for the successive separation of constituent phases distinguished by their distinctive specific gravities comprising:
   A. an elongated, substantially cylindrical side wall concentric to an upwardly extending axis and having axially opposite upper and lower ends;
   B. means closing the upper and lower ends of the side wall;
   C. a division plate extending transversely centrally of the side wall defining a succeeding separator upwardly of the plate and a preceding separator downwardly of the plate;
   D. a tubular upper vortex finder extending concentrically about said axis through the upper end closing means having an open upper outlet end and an open lower inlet end downwardly spaced from the closing means;
   E. an upper vortexing chamber extending axially within the side wall from the upper closing means to a position downwardly spaced from the inlet end of the upper vortex finder;
   F. an upper receiving chamber extending axially within the side wall from the upper vortexing chamber to the division plate;
   G. a tubular lower vortex finder extending concentrically about said axis through the division plate having a closed upper outlet end axially centrally of the receiving chamber of the succeeding separator and an open lower inlet end downwardly spaced from the division plate;
   H. a lower vortexing chamber extending axially within the side wall from the division plate to a position downwardly spaced from the inlet end of the lower vortex finder;
   I. a lower receiving chamber extending axially within the side wall from the lower vortexing chamber to the lower end closing means;
   J. a cylindrical outer wall disposed in concentric, circumscribing spaced relation to the side wall and extending axially thereof from an upper end adjacent to the means closing the upper end of the side wall to a lower end spaced toward the division plate from the closed outlet end of the lower vortex finder, the outer wall defining a cylindrical passage between the outer wall and the side wall;
   K. means closing the cylindrical passage of the upper and lower ends of the outer wall;
   L. means for admitting such a fluid system tangentially about said axis into the lower vortexing chamber between the division plate and the inlet end of the lower vortex finder to swirl the fluid system therein to deposit a portion of a heavier phase into the lower receiving chamber with the balance of the system flowing into said inlet end of the lower vortex finder;
   M. a conduit extending transversely from the lower vortex finder adjacent to the closed outlet end thereof to the cylindrical passage for flow of said balance of the fluid system from said outlet end into the cylindrical passage; and
   N. means for admitting said balance of the fluid system from the cylindrical passage in a direction tangential to said axis into the upper vortexing chamber between the upper closing means and the inlet end of the upper vortex finder for deposition of a heavier phase of said system downwardly into the upper receiving chamber and passage of the lighter phase upwardly through the upper vortex finder.

11. The combination of claim 10 wherein the means for admission of the balance of the fluid system from the cylindrical passage into the upper vortexing chamber comprises a plurality of bores extending through the side wall tangentially about said axis.

12. The combination of claim 10 wherein
   A. the conduit extending from the outlet end of the lower vortex finder to the cylindrical passage is curved so that said balance of the fluid system flowing therethrough is admitted into the inlet chamber in a direction tangential to said axis; and B. said admission through the conduit, admission into the lower vortexing chamber, and admission into the upper vortexing chamber are in the same direction tangential to said axis.

13. The combination of claim 10 including means for drawing off said heavier phase portions of the fluid system deposited in the receiving chambers.

14. The combination of a pair of substantially cylindrical, axially upwardly extended, centrifugal fluid separators each having an inlet and an outlet; means interconnecting the separators in coaxial alignment whereby there are a relatively lower separator and a relatively higher separator; and a cylindrical wall concentrically circumscribing the upper separator and therewith defining a cylindrical passage having a lower end connected to the outlet of the lower separator and an upper end connected to the inlet of the upper separator.

* * * * *